Figure 1:
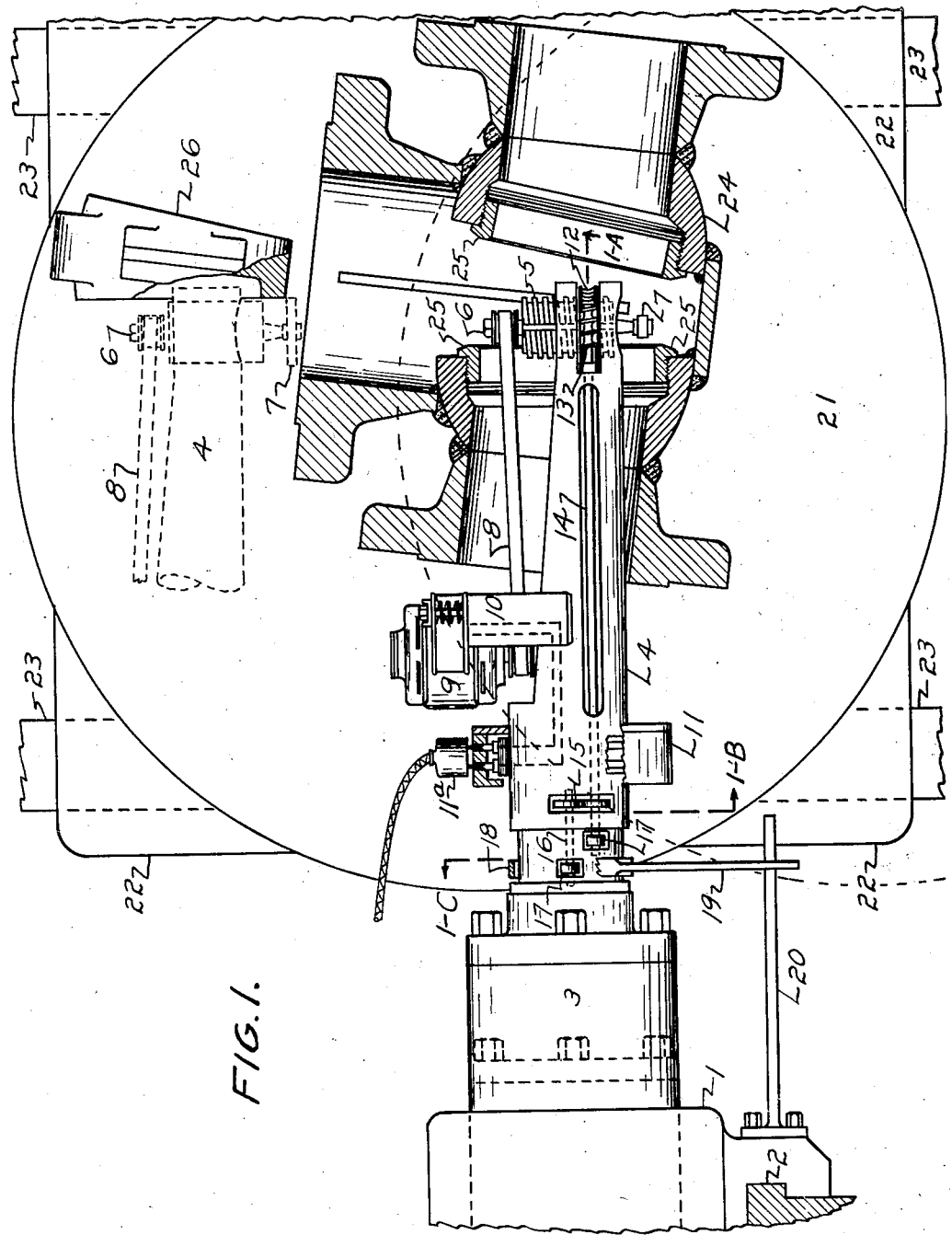

Nov. 13, 1934.    L. G. PLANT    1,980,928
GATE VALVE SEAT SURFACING MACHINERY
Filed March 16, 1933    2 Sheets-Sheet 1

INVENTOR
Leland G. Plant

WITNESS
W.H.Jury

Nov. 13, 1934.  L. G. PLANT  1,980,928
GATE VALVE SEAT SURFACING MACHINERY
Filed March 16, 1933  2 Sheets-Sheet 2
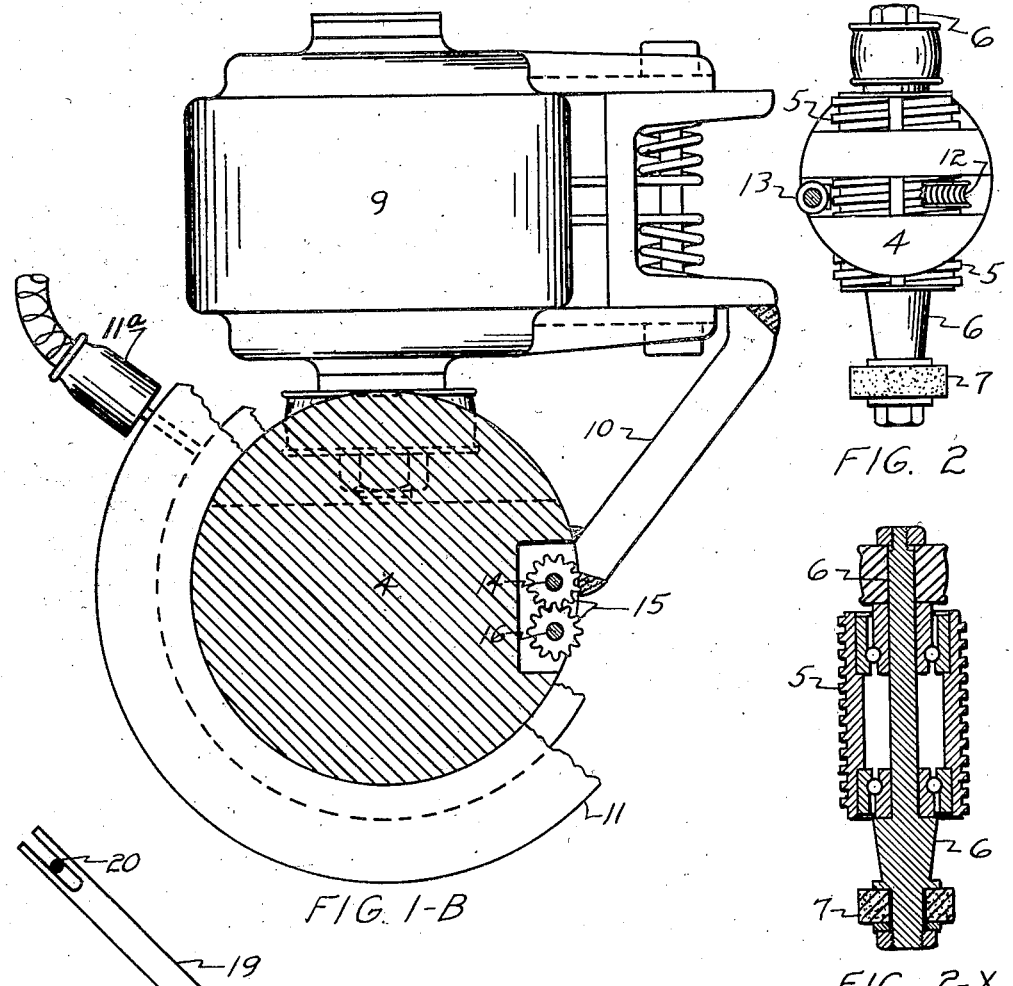
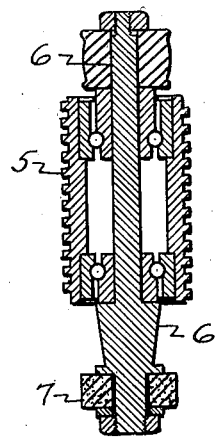
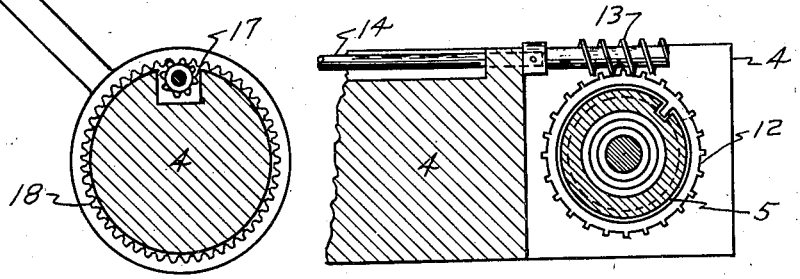
INVENTOR
Leland G. Plant
WITNESS
W.H.Jury Patented Nov. 13, 1934

1,980,928

UNITED STATES PATENT OFFICE 1,980,928

GATE VALVE SEAT SURFACING MACHINERY

Leland G. Plant, Chicago, Ill.

Application March 16, 1933, Serial No. 661,071

4 Claims. (Cl. 51—43)

This invention relates to machinery useful in the manufacture and maintenance of valves particularly valves of the so-called "gate" type that depend for closure upon the insertion of a gate between two ports, in sealing contact therewith.

The effectiveness of a gate valve depends upon the seal between the faces of the gate and the surfaces of the two ports when the valve is in a closed position. Unless there is contact between the gate and the ports extending around the entire circumference thereof, the fluid to be valved can leak past the gate.

In manufacturing and maintaining gate valves, one of the problems is to provide such a seating contact between the gate and the ports as will prevent any fluid leakage through the valve. A very minute space between the surfaces of the gate and the ports may cause a leak, the extent of which depends upon the nature of the fluid to be valved. A viscous fluid at low pressures can be easily valved but it is very difficult to provide such seating surfaces between the gate and ports as will prevent the leakage of gaseous fluids, particularly at high pressures and temperatures. In the case of a fluid such as high pressure steam, a small initial leak between the gate and port surfaces, enlarges rapidly owing to the cutting effect of steam upon surfaces adjacent to the leak channel, notwithstanding the use of hardened alloy metals for these surfaces.

If the nature of the fluid to be valved is not such as to exert a destructive effect upon the gate and port surfaces, these may be made of relatively soft metals as for instance, bronze, which will yield sufficiently at their initial points of contact to establish, under pressure, a continuous circumferential contact between the faces of the gate and ports, even if these faces are slightly uneven so that they do not register perfectly, one against the other until the gate is forcibly pressed against the ports between which it is inserted in the act of closing the valve. But if the gate and port faces have hard, unyielding surfaces as for instance, hardened stainless steel or nitralloy, these faces must in preparation, be so perfectly surfaced that they will register an unbroken circumferential contact, one against the other, when the gate comes in contact with the ports.

Each valve of the gate type has two circumferential contacts (one on each side of the gate), both of which should be proof against leakage. If the gate is in the form of a solid wedge, as most commonly employed in valves of this type, then all contacting faces must not only have flat circular contours, but the two faces of the gate must be at an angle to each other which corresponds exactly to the angle between the two planes in which the port faces lie. The manufacture of gate valves to conform with these requirements is complicated by the usual practice of forming the contacting surfaces upon hardened metal rings which are inserted in the valve. When the port faces are thus formed, these rings are usually finished as completely as possible before being inserted in the valve body. But in the process of inserting these rings (which are usually threaded into the valve) they are subject to some distortion which ordinarily necessitates re-surfacing their faces after assembly in the valve. When the contacting surfaces of a valve gate and ports have become worn or mutilated in service, it is also necessary to re-surface their faces while in the valve.

It has not been found possible to produce valve gate and port surfaces of desired contacting capacity by means of machinery ordinarily used in making and assembling valve parts.

The final surfacing of the valve gate and of the port faces after their assembly in the valve, to obtain a continuous circumferential contact between the face of each port and the gate, is always an exacting and often a laborious step either in the manufacture or repair of gate valves.

The usual procedure at present, is to employ machines to make and assemble valve parts with as much accuracy as possible. When assembled, the gate and port faces are brought to a bearing contact by a manually controlled grinding operation. That is, after locating the so-called "high spots" which are the points at which the gate and port faces initially contact, these are ground down with an abrasive. In this way, the higher surface spots are worn down until they merge into a line of contact extending entirely around each port. However, the nature of this process is such that although serving to establish a continuous circumferential contact between the gate and each port face, the faces on opposite sides of the gate are not necessarily identical in contour. Consequently, once the gate and ports have been surfaced in this manner, the position of the gate cannot be reversed nor can another gate be substituted without further surface grinding in the manner described. It is customary therefore to provide valves of the type described, with gate guides of a different width on opposite sides of the valve body so that the position of a gate which has thus been "ground in" cannot ever be reversed. It is generally necessary to employ the same hand grinding procedure when the gate or the rings with which the ports are faced, are renewed in the course of repairing a valve.

The purpose of this invention is to provide means, not wholly dependent upon manual skill or exertion, for producing in a valve of the gate type, surfaces upon both sides of a gate and upon the faces of both ports within the valve, affording a continuous circumferential contact of uniform bearing area between said port faces and said gate, either in one position or the reverse. To accomplish this objective, I have devised a power actuated machine which provides: 1st, a table on the face of which a valve body and its gate can be rigidly mounted; 2nd, rails upon which said table can be shifted in a straight path; 3rd, a pivot perpendicular to the plane of said rails, upon which the face of said turntable can be revolved at will; 4th, a tool-carrying bar that can be shifted longitudinally and revolved in a plane perpendicular to the pivotal axis of said turntable; 5th, guides on which said bar can be shifted to increase or diminish its distance from said table without altering its angularity thereto; 6th, at one end of said bar a surfacing tool (preferably an abrasive wheel revolved at high speed) mounted so that it can be applied to plane surfaces perpendicular to the axis of said bar, and means for enlarging or diminishing the radius described by said tool as the bar upon which it is mounted, is revolved.

The general arrangement and principal details of the machine embodying this invention are illustrated in the accompanying drawings of which Figure 1 is a partly sectioned plan view of the machine embodying this invention, showing a valve body and its gate mounted thereon; Figure 1—A is a longitudinal section on plane A thru the end of the tool-carrying bar of the machine shown in Fig. 1; Figure 1—B is a cross-section of the same bar, on plane B, viewed in the direction indicated on Fig. 1; Figure 1—C is another cross-section of the same bar on plane C, viewed in the direction indicated on Fig. 1; Figure 2 is a partly sectioned end elevation of the tool-carrying bar of Fig. 1, and Figure 2—X is a longitudinal section thru the grinding tool of Fig. 2.

In the above drawings: 1 is a bearing block and 2, the support and guides by which this bearing is adjustably supported; 3 is a shaft slidably and rotatably supported in rigid axial alignment by the main bearing 1, (conventional power means such as an electric motor, proposed for rotating this shaft is not shown in these drawings); 4, is the tool-carrying bar extension to shaft 3; 5 is a quill, or shaft bearing, the outer cylindrical wall of which is threaded and screwed thru the end of bar 4, at a right angle thereto; 6, is the shaft supported by said quill; 7, is an abrasive grinding wheel, mounted on one end of said shaft; 8, is a belt, engaging a pulley at the other end of said shaft; 9, is a motor with a driving pulley also engaging said belt; 10, is a bracket projecting from bar 4, and supporting said motor; 11, is a current collector designed to complete an electric circuit between a conductor 11a, from a remote source and the motor 9, as this motor revolves with bar 4; 12, is a collar adapted to slide longitudinally over the threaded surface of quill 5, but keyed so that it cannot turn thereon, and having outwardly projecting teeth engaging a worm gear 13, on the end of a shaft 14. Near the other end of shaft 14, is a spur gear 15, engaging a like spur gear 15, mounted on another shaft, 16, and on the ends of shafts 14 and 16, are mounted spur gears 17. A ring 18, with internally projecting teeth is slidably fitted over the bar 4, so that it can be made to engage, or disengage from either of gears 17, alternately at will. An arm 19, projecting from ring and engaging pin 20, prevents the ring 18, from turning with the bar 4.

Separated from the group of elements above listed, but an integral part of this machine, is 21, representing a table, pivoted upon a bed plate 22, which, in turn, is supported upon the rails 23, these rails and the supporting guides 2, being rigidly mounted upon one and the same foundation (not shown in these drawings); 24, is the body of a gate valve shown in section, with its two ports having faces 25, formed on rings threaded into the valve body, one of said faces being shown in a position to be surfaced by the grinding wheel 7; and 26, is the gate for said valve body, also shown in a position to have one of its faces surfaced by the grinding wheel 7, after the turntable 21 and bedplate 22 have been shifted to the position indicated by the broken line on Fig. 1, so that the bar 4, and wheel 7, are in the relative position also indicated by broken lines of Figure 1.

Preliminary to the use of my invention, each port face in a gate valve body and each face of its gate are separately surfaced to as nearly a mutual seating surface as possible of attainment by established machine steps. In the practice of my invention the valve body 24, and its gate 26, are separately placed and clamped upon the face of the pivoted table 21, in such a position relative to each other that the guide grooves of said gate and the guide rails therefor, in said body, are in line, and so that the plane or planes of one gate face and one port face are approximately parallel to the pivotal axis of said table. The face of said table should be in a plane to which said pivotal axis is perpendicular, so that in mounting the valve parts upon this table face, it is simply necessary to establish their right-angularity thereto. Since the planes of both port faces 25, should be approximately, at right angles to the axis of the thru barrel of the valve body 24, their right-angularity to the face of table 21, can be easily approximated by locating said barrel axis parallel to said table face.

After positioning the valve body 24 and its gate 26, upon the pivoted table 21, as above described, this table is rotated until the axis of shaft 3 and bar 4, is approximately perpendicular to the one gate face and/or one port face, in which position the table is stationed upon its bed plate 22. Then, the relative positions of table 21, with its bed plate 22, and of the shaft 3, with its extension bar 4, are shifted upon rails 23 and guides 2, respectively, until the axis of said shaft and bar is approximately central to the facial circumference of that gate and/or that port to which said axis is approximately perpendicular. The next step is to adjust the quill 5, supporting the shaft 6 with its grinding wheel 7, so that this will describe a circle wholly within (or wholly outside) of the face to which said axis has been made approximately central. Then shaft 3 is slid laterally in bearing 1, until the periphery of wheel 7 is tangent to a plane slightly below the face of the gate or port to be immediately surfaced.

Shaft 3, with its extension bar 4, is now rotated by some appropriate power means, and at the same time, electric current is supplied to motor 9, through the collector 11, causing the motor shaft and pulley to rotate rapidly and thru belt 8, to spin the shaft 6, with wheel 7, at high speed. As the shaft 3, and bar 4 is slowly rotated the gear ring 18, is shifted to engage one or the other of spur gears 17. As the ring 18 is prevented by pin 20, from rotating with bar 4, the effect, (as the bar 4 turns) is to rotate whichever of the gears 17, is engaged by ring 18. Dependent upon which of said gears 17, is thus rotated, the shaft 14 turns in a clockwise, or in a counter-clockwise direction, while the auxiliary shaft 16 turns in the reverse direction. Thus, the shaft 14, can be rotated in either direction at will, as bar 4 turns.

By rotating shaft 16, as above described, the effect is to rotate the spur gear collar 12, thru the worm gear 13, mounted on the end of shaft 16. As collar 12, is keyed to quill 5, so that it can slide longitudinally upon the cylindrical surface of said quill, but not turn upon this cylinder, the result of rotating shaft 14, is to turn the quill 5, which is threaded thru bar 4, at a relatively slow rate. As the cylindrical barrel of quill 5, thus turns in bar 4, to which it is threaded, the center of grinding wheel 7 mounted on shaft 6, in said quill, travels slowly in a direction transverse to the axis of bar 4, either outwardly or inwardly thereto, so as to describe a spiral path as the bar 4, rotates. If the initial position of wheel 7, is within the facial circumference of the gate or port to be immediately surfaced, the gear ring 18, is shifted to mesh with that one of the two gears 17, which when rotated will cause the wheel 7 to move outwardly; whereas, if the initial position of wheel 7, is without said facial circumference, the ring 18, is shifted so as to mesh with the other of said gears 17, thus causing the wheel to describe a spiral path of decreasing radius as the bar 4, is rotated.

In the practice of grinding hard metal surfaces with an abrasive wheel of small diameter, as above described, a speed of more than 10,000 revolutions per minute may be required and is obtainable by belt drive from electric motors of the type considered for this invention. The depth of surface to be ground from the face of either the gate or a port in one operation may be a thousandth of an inch. The radius of the spiral described by the grinding wheel 7, can either be increased or diminished by one hundredth of an inch with each revolution of the bar 4, which is in accordance with good grinding practice.

If the surface of the gate or port face to be ground is so uneven that the grinding wheel 7, does not cut into the surface around its entire circumference at one operation as above described, this operation is repeated after moving the wheel 7, slightly closer to said surface, by sliding shaft 3, laterally in its bearing 1, and reversing direction of the spiral path imparted to wheel 7, by shifting collar 18, from engagement with one of the gears 17, to engage the other of said gears 17. After the entire circumference of one gate face has been surfaced in the manner described, the position of wheel 7, is shifted until its periphery is tangent to a plane slightly below the surface of the port to be surfaced parallel to said gate face or, if the port face has first been surfaced, the wheel 7, is shifted to the position required for surfacing the gate face parallel to said port face. In shifting the wheel 7, as described, the planes to which the periphery of this wheel are tangent in its rotation about the axis of bar 4, must necessarily be parallel because this shifting step is accomplished entirely without altering the relative angularity of any element of the machine or any of the valve parts to be surfaced.

Having completed surfacing one port face in a valve body and the parallel face of the valve gate, in the manner above described, the next step is to rotate the pivoted table 21, thru an angle of 360 degrees, less the angle desired between the planes of the two port faces. Having thus rotated this table and stationed it at this new angle upon its bed plate 22, the process of grinding the second port face and gate face in parallel planes, is accomplished by substantially the same steps previously employed in surfacing the reverse side of the gate and opposite port face.

The result of grinding the four faces according to the steps above described, is the production of a symmetrically faced gate, having an angularity between the planes of its two faces, exactly equal to the angle between the two planes of the port faces of the valve body. The practice of this invention also produces seating surfaces, of uniform bearing area around the entire circumferential line of contact between the port and gate faces, even when the position of the gate between these ports is reversed. The invention is applicable not only to new valves in the process of manufacture but may be utilized for repairing old valves in which the seating surfaces between the port faces and faces on each side of the gate, have been damaged or become worn thru use, to such an extent that they no longer afford circumferential contacts of uniform bearing area.

Having stated the motive for this invention, described its principal physical characteristics, explained how it operates, and cited certain results accomplished more perfectly and with less effort than previously known, I claim as new:

1. In a gate valve seat surfacing machine, a table, adapted for rigidly supporting upon its face, a gate valve body and its gate, in separate positions fixed relatively to each other, a bed plate on which said table is pivoted, a rail path upon which said bed plate together with said table and its pivot, may be shifted in a straight line direction lateral to the axis of said pivot, rectilinear guides in a plane angular to the plane of said rail path, a rigid foundation common to said rail path and said guides, a bearing block movably supported in the path of said guides, a shaft rotatably and slidably mounted in said bearing block, power means for rotating said shaft, an extension bar projecting from one end of said shaft in rigid axial alignment therewith, a cylindrical quill threaded thru said bar near its extremity and axially right-angular thereto, a spur gear collar slidably mounted on the surface of said quill and keyed thereto, a worm gear engaging said spur gear, a worm gear shaft supported longitudinally upon said bar and an auxiliary shaft so geared to said worm shaft as to turn counter thereto, two gear wheels, one keyed to said worm and the other to said auxiliary shafts, a gear ring surrounding said bar and adapted selectively, at will, to mesh with either or neither of said gear wheels, means for preventing said gear ring from revolving as said bar is rotated, an electric motor mounted upon said bar, a current collector adapted to complete the circuit between said motor and an extraneous source of electric power as said bar with said motor is rotated, a spindle rotatably mounted in, and axially parallel to, said quill, means (such as a belt drive) for rotating said spindle by said motor, and an abrasive wheel mounted upon said spindle.

2. In a gate valve seat surfacing machine, a table adapted for rigidly supporting upon its face, a gate valve body and its gate, in separate positions fixed relatively to each other, a bed plate on which said table is pivoted, a rail path upon which said bed plate together with said table and its pivot may be shifted in a straight line direction lateral to the axis of said pivot, rectilinear guides in a plane angular to the plane of said rail path a rigid foundation common to said rail path and said guides, a bearing block movably supported in the path of said guides, a shaft rotatably and slidably mounted in said bearing block, power means for rotating said shaft, an extension bar projecting from one end of said shaft in rigid axial alignment therewith, a quill supported by, and axially right-angular to, said bar, a spindle rotatably mounted in, and axially parallel to, said quill, power means for rapidly rotating said spindle as said shaft and said bar are being slowly revolved, means for shifting said quill together with said spindle, in the direction parallel to their axes, a uniform distance with each rotation of said bar, and an abrasive wheel mounted upon one end of said spindle.

3. In a gate valve seat surfacing machine, an extension bar adapted for attachment to one end of a power driven shaft in rigid axial alignment therewith, a cylindrical quill threaded thru said bar near its extremity and axially right-angular thereto, a spur gear collar slidably mounted on the surface of said quill and keyed thereto, a worm gear engaging said spur gear, a worm gear shaft supported longitudinally upon said bar and an auxiliary shaft so geared to said worm shaft as to turn counter thereto, two gear wheels, one keyed to said worm shaft and the other to said auxiliary shaft, a gear ring surrounding said extension bar and adapted selectively, at will, to mesh with either or neither of said gear wheels, means for preventing said gear ring from revolving as said bar is rotated, an electric motor mounted upon said bar, a current collector adapted to complete the circuit between said motor and an extraneous source of electric power as said bar with said motor is rotated, a spindle rotatably mounted in and axially parallel to, said quill, means (such as a belt drive) for rotating said spindle by said motor, and an abrasive wheel mounted upon said spindle.

4. In a gate valve seat surfacing machine, an extension bar, adapted for attachment to one end of a power driven shaft in rigid axial alignment therewith, a quill supported by said extension bar near its extremity and axially right-angular thereto, a tool-carrying shank rotatably supported by said quill in axial alignment therewith, means for shifting said quill together with said shank, in the direction parallel to their axes, a uniform distance with each rotation of said bar and a gate valve seat surfacing tool angularly mounted upon one end of said shank.

LELAND G. PLANT.